Nov. 15, 1955 F. H. INE 2,723,831
VACUUM NOZZLE VALVE
Filed June 23, 1952
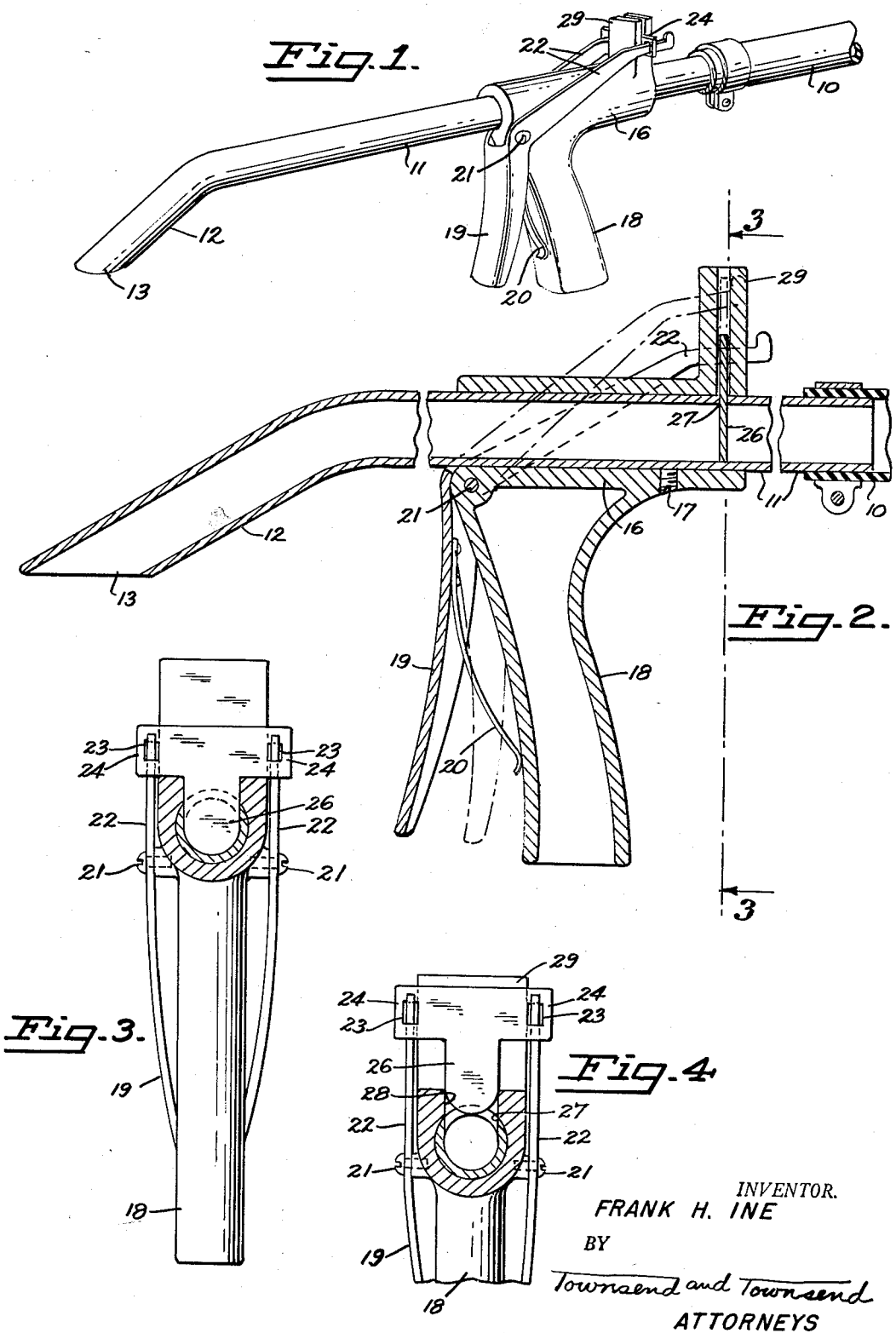
INVENTOR.
FRANK H. INE
BY
Townsend and Townsend
ATTORNEYS

United States Patent Office 2,723,831
Patented Nov. 15, 1955

2,723,831

VACUUM NOZZLE VALVE

Frank H. Ine, Milwaukee, Wis.

Application June 23, 1952, Serial No. 295,073

5 Claims. (Cl. 251—155)

This invention relates to a new and useful valve for installation adjacent the nozzle end of a vacuum line. The valve comprises a single, inexpensive, manually operable device which may be installed in a vacuum line for effectively controlling application of suction to the nozzle.

The invention finds particular application in the processing of poultry. After the viscera have been removed from the poultry carcass, the next step is the removal of the lungs from the pleural cavity. This is ordinarily accomplished by inserting a vacuum pipe into the pleural cavity and drawing the lungs out of the carcass.

At the present time removal of poultry lungs is frequently performed by means of a pipe which is connected to a vacuum tank, there being a continuous vacuum drawn in the tank and through the pipe. There are several disadvantages to this arrangement, one being that there is a wastage of power in maintaining a constant vacuum in the tank. Another disadvantage is that if the vacuum is drawn continuously through the pipe and if the pipe accidentally comes in contact with some portion of the carcass such as the tail before it reaches the lungs, the carcass may be damaged and considerable difficulty occasioned in attempting to remove the pipe from contact with the carcass.

In the present invention a valve is inserted adjacent the nozzle so that the nozzle is closed except during actual extraction of the lungs, thereby minimizing the load on the vacuum pump. This results in employment of a smaller pump and smaller driving motor. The present valve also results in maintaining a higher vacuum in the vacuum tank by reason of the fact that the vacuum can be built up while the valve is closed. Further, the instant invention enables the nozzle to be closed to a source of vacuum while it is being inserted into the pleural cavity and thus prevent the nozzle from catching upon some other part of the anatomy of the fowl.

One of the features of the invention is the fact that the valve comprises a slidable plate which extends down to close off the vacuum pipe, said plate being actuated manually to an open position whereby it is entirely removed from the vacuum line. Thus, the possibility of the plate becoming covered with viscera, lungs and the like is obviated. Further, when the plate is slid out of the vacuum tube it is cleaned by contact with the edge of the valve housing which scrapes the surface of the plate.

Another feature of the invention is the convenient shape of the valve operating structure and nozzle, which fits comfortably into the hand of the operator to facilitate rapid and efficient operation.

Other objects of the present invention will become apparent upon reading the following specification and referring to the accompanying drawings in which similar characters of reference represent corresponding parts in each of the several views.

In the drawings:

Fig. 1 is a perspective of the nozzle and valve.
Fig. 2 is a longitudinal vertical section.

Fig. 3 is a section taken substantially along the line 3—3 of Fig. 2 showing the valve in closed position.
Fig. 4 is a fragmentary section similar to Fig. 3 showing the valve in open position.

As shown in the accompanying drawings, there is provided a flexible hose 10 which leads to a vacuum tank (not shown) wherein by means of a conventional vacuum pump and driving mechanism a vacuum is maintained. At the end of the flexible hose 10 there is provided a nozzle pipe 11 comprising a lightweight, rigid, round tube, having an inside diameter preferably large enough to permit free and unobstructed passage therethrough of the lungs of a fowl. The extremity 12 of the tube is bent downward at an angle of about 45° with the tip 13 cut at an angle so that the lower edge of the nozzle is approximately parallel to the axis of the remote end of the tube.

The instant valve comprises a body member having a tubular portion 16 which slides over and fits tightly around the upper end of tube 11 and is held in position by a setscrew 17. The forward end of the tubular portion 16 is provided with a depending grip 18 which conveniently fits the hand of the operator. A trigger 19 is pivotally mounted on the forward end of the grip 18 which is conveniently contacted by the fingers of the operator, said trigger 19 being actuable by the fingers of the operator by pressing rearwardly toward the grip 18, against the force of flat spring 20 having one end secured to the inside face of trigger 19 and having its other end in slidable contact against grip 18. The trigger is pivotally mounted by pin 21 which passes through the grip portion 18. A pair of rearwardly extending levers 22 is formed integrally with trigger 19, these levers extending at an angle up above the top of the tubular portion 22 adjacent the rear thereof, and being connected to fit within enlarged holes 23 in laterally projecting ears 24 of a vertically sliding plate 26, hereinafter described in detail. The extremities of the levers are enlarged or bent to prevent dislodgment from the holes in the plate.

Plate 26 is slidable through a slot 27 in the top of tube 11 and extends up through a registering slot 28 in an upwardly projecting boss 29 on the valve body. The boss 29 projects upward a sufficient distance so that the plate 26 is enclosed and protected against damage even when the valve is in fully open position.

The lower end of the plate 26 is curved with a radius of curvature substantially equal to the curvature of the inside of the tube 11. Thus when the valve is in closed position, the bottom edge of plate 26 fits against the bottom of the tube 11, and since the width of plate 26 is equal to the inside diameter of tube 11, pipe 11 is closed off.

When trigger 19 is manually gripped and pressed against grip 18, levers 22 pivot upward about pin 21 as a fulcrum, and since the extremities of said levers 22 fit within holes 23 in laterally extending ears 24 in plate 26, plate 26 is raised, the extent of lifting being sufficient so that bottom edge of plate 26 clears the inside of tube 11 and thus does not obstruct passage through said tube.

It will further be seen that as plate 26 is lifted it scrapes against the edge of slot 27, thereby cleaning the surface of the plate and removing any foreign matter which has collected thereupon.

When the valve is in fully open position, the upper edge of plate 26 is protected against bending by reason of the fact that it is at all times enclosed within boss 29. Upon manual release of the trigger 19, the force of flat spring 20 will return said trigger and the valve elements comprising plate 26 to their original position, as shown in Fig. 1.

Although I have described my invention in some detail by way of illustration and example for purposes of clarity of understanding, it is understood that certain changes and modifications may be made within the spirit of the invention as limited only by the scope of the claims appended hereto.

What is claimed is:

1. A valve structure in combination with a tube wherein the top half of said tube is formed with a transverse slot, comprising: a body having a bore receiving and fitting tightly around said tube; a handle grip depending from said body; a trigger pivotally hinged at its upper end to said body and disposed with its lower extremities depending below said tube in gripping proximity to said handle grip for swingable trigger movement about its hinged axis relatively toward and away from said handle grip; a gate valve plate mounted slidably in said slot for reciprocable upward and downward movement within said slot to respectively open and close communication through said tube; a lever operatively connected to said trigger and extending upwardly above said tube; the upper end of said lever connected to the upper extremities of said plate; said lever operable to raise said plate slidably upwardly within said slot to open communication through said tube when said trigger is swingably moved about its hinged axis in a direction toward said handle grip.

2. A valve structure in combination with a tube wherein the top half of said tube is formed with a transverse first slot, comprising, a body having a bore receiving and fitting tightly around said tube, a trigger pivotally mounted on said body depending below said tube, a lever operatively connected to said trigger and projecting upwardly therefrom above said tube, a boss projecting upwardly from said body transverse to said tube, said boss being formed with a second slot in registry with said first slot and a plate slidable within said second slot, said plate having an ear projecting laterally, said ear being apertured to receive the upper end of said lever, said plate being arranged to close off the interior of said tube when said trigger is in one position and retract from said tube when said trigger is in a different position.

3. A valve structure in combination with a tube wherein the top half of said tube is formed with a transverse first slot, comprising, a body having a bore receiving and fitting tightly around said tube, a handle grip rigidly secured to said body and depending therefrom, a trigger pivotally mounted on said body depending below said tube and located forwardly of said handle grip for relative pivotal movement toward and away from said handle grip about the pivotal axis of said trigger, a pair of levers operatively connected to said trigger extending upwardly around opposite sides and above the top of said body, a boss projecting upwardly from said body transverse to said tube, said boss being formed with a second slot in registry with said first slot, and a plate slidable within said second slot, said plate having a pair of ears extending laterally, each of said ears being apertured to receive pivotally and slidably the upper end of one of said levers, said plate being arranged to close off the interior of said tube when said trigger is in one position and retract from said tube when said trigger is in a different position.

4. A valve structure in combination with a tube wherein the top half of said tube is formed with a transverse first slot, comprising, a body having a bore receiving and fitting tightly around said tube, a handle grip rigidly secured to said body and depending therefrom, a trigger pivotally mounted on said body depending below said tube and located forwardly of said handle grip for relative pivotal movement toward and away from said handle grip about the pivotal axis of said trigger, a pair of levers operatively connected to said trigger and extending upwardly to opposite sides and above said body, a boss projecting upwardly from said body transverse to said tube, said boss being formed with a second slot in registry with said first slot, and a plate slidable within said second slot, said plate comprising a closure member having an arcuate lower edge with a radius of curvature equal to the radius of the inner surface of said tube, the upper end of said plate being formed with outwardly projecting ears extending beyond the lateral edges of said boss, said ears being apertured externally of said boss to receive the upwardly projecting ends of said levers, said apertures being longer than the thickness of the ends of said levers to permit sliding movement of said levers within said apertures, said plate being arranged to close off the interior of said tube when said trigger is in one position and retract from said tube when said trigger is in a different position.

5. A valve structure comprising a pneumatic tube having a nozzle, said tube being formed with a transverse first slot in the top of said tube adjacent said nozzle, a body having a bore fitting around said tube and overlying said first slot, a handle depending from said body, trigger pivotally mounted on said body adjacent the underside of said tube and depending adjacent said handle forwardly of said handle, a pair of rearwardly and upwardly extending levers movable with said trigger and having thin, narrow anterior portions, a boss projecting upwardly from said body above said first slot, said boss being formed with a second slot in registry with said first slot and extending transverse to said tube, and a thin, plate closure member slidable within said second slot and through said first slot, said plate being formed with ears projecting laterally through said second slot and beyond said boss, said ears being formed with enlarged apertures to receive the anterior portions of said levers, said plate being arranged to close off the interior of said tube when said trigger is in one position and to retract when said trigger is in a different position.

References Cited in the file of this patent

UNITED STATES PATENTS

| | | |
|---|---|---|
| 400,128 | Shepherd | Mar. 26, 1889 |
| 615,550 | Hawkins | Dec. 6, 1898 |
| 838,479 | Tromblee | Dec. 11, 1906 |
| 911,782 | Tolles | Feb. 9, 1909 |
| 939,069 | McLean | Nov. 2, 1909 |
| 1,512,431 | Trowe | Oct. 21, 1924 |
| 2,227,578 | Fraser | Jan. 7, 1941 |

FOREIGN PATENTS

| | | |
|---|---|---|
| 699,101 | France | Dec. 8, 1930 |